United States Patent
Cooper

(10) Patent No.: US 6,544,329 B1
(45) Date of Patent: Apr. 8, 2003

(54) SALT POULTICE

(76) Inventor: Barrie David Cooper, 62 Jacaranda Drive, Bass Hill, New South Wales, 2197 (AU)

( * ) Notice: Subject to any disclaimer, the term of this patent is extended or adjusted under 35 U.S.C. 154(b) by 0 days.

(21) Appl. No.: 09/700,542

(22) PCT Filed: May 18, 1999

(86) PCT No.: PCT/AU99/00372

§ 371 (c)(1),
(2), (4) Date: Dec. 18, 2000

(87) PCT Pub. No.: WO99/59937

PCT Pub. Date: Nov. 25, 1999

(30) Foreign Application Priority Data

May 18, 1998 (AU) .............................................. PP 3554

(51) Int. Cl.[7] .............................................. C04B 14/26
(52) U.S. Cl. .................................. 106/817; 106/DIG. 2
(58) Field of Search ............................ 106/817, DIG. 2

(56) References Cited

U.S. PATENT DOCUMENTS

| 3,719,513 A | * | 3/1973 | Bragg et al. |
| 3,839,059 A | * | 10/1974 | Rothfelder et al. |
| 5,634,968 A | * | 6/1997 | Pfaller et al. |
| 5,782,961 A | | 7/1998 | Folke et al. |
| 5,820,303 A | | 10/1998 | Schneider |

FOREIGN PATENT DOCUMENTS

| ES | 2085216 | * | 5/1996 |
| PL | 131996 | * | 1/1985 |

OTHER PUBLICATIONS

Derwent Abstract Accession No. 88–054362/08, J6 3011587 A (Mitsui Toatsu Chem Inc) Jan. 19, 1988.
Derwent Abstract Accession No. 89–357633/49, DE 3829328 (Ortleppw) Dec. 7, 1989.

* cited by examiner

Primary Examiner—Paul Marcantoni
(74) Attorney, Agent, or Firm—Kenyon & Kenyon

(57) ABSTRACT

The invention provides a poultice or sacrificial render comprising fibrous material and diatomaceous earth. Preferably, the ratio of fiber to diatomaceous earth is in the range of 1:6 to 6:1 and the fibrous material contains relatively long fibers, such as would be obtained from the manufacturing or pulping of quality paper, for example, fibers in the range of 1mm to 4mm. The invention also provides a poultice mixture comprising fiber, diatomaceous earth and water and optional additives such as a binder or thickening agent and a biocide. The invention also provides a method of removing salt from a salt permeable object comprising the step of applying the poultice mixture to the salt permeable object.

22 Claims, 1 Drawing Sheet

SALT POULTICE

TECHNICAL FIELD

The invention relates to the removal of salt from salt permeable objects, in particular stone and masonry walls.

BACKGROUND ART

The presence and movement of salt in stone and masonry is a major cause of decomposition of stone, brickwork and the like as well as plater and other masonry coatings. The problem is particularly detrimental to stone walls. It is believed that mineral salts dissolved in water enter a stone wall at the bottom or on one face of the wall. Capillary action pulls the water through or up the wall, the driving force being the evaporation of water at a point remote from the entry point of the water. As the water evaporates, it leaves behind salts, which solidify at or near the surface. The salt crystals which form interfere with the structure of the masonry and lead to surface crumbling. As the outer layer of masonry crumbles away, more salt is drawn to the surface and so the crumbling continues.

The invention has been developed primarily for use in the field of building conservation and restoration and will generally be described hereinafter with reference to that purpose. However, it will be appreciated that the invention is not limited to this particular field of use.

One method of addressing this problem has been to transfer the point of deterioration caused by the salts by applying a poulticing plaster, or sacrificial rendering, to the stone wall to absorb salt from the stone and to provide a sacrificial surface which can be allowed to crumble without undue concern.

Sacrificial renders to date have suffered from a number of drawbacks. Generally, sacrificial renders which are sufficiently absorbent to remove salts and water from stone possess mechanical properties which mean they only last for a few weeks in areas of high salt contamination, disintegrating beyond a useful state in generally too short a time to completely remove salts from the wall. Also, unless stringent maintenance is observed, salts brought to the surface fall to the ground at the base of the wall during the exfoliation process, reverting to a saline solution on contact with ground water that is again drawn through the masonry by capillary action, thereby creating a continuous cycle.

Mechanically stronger renders tend to be less efficient at removing the salt from the wall. Another problem with such renders is that they tend to leave residual material on the stone when they are removed or eventually decompose. Examples of such renders are mixtures of fibreglass fibres with either a sand and lime, sand, cement and lime, or clay base. Attempts at using emulsified pulp alone have led to very unsatisfactory poultices, which shrink upon drying and do not adhere to the wall.

It is an object of the present invention to overcome or ameliorate one or more of the disadvantages of the prior art, or at least to provide a useful alternative.

SUMMARY OF THE INVENTION

According to a first aspect, the invention consists in a material for application to a salt permeable object to remove salt from that object, said material including a fluid permeable substrate and an agent for increasing the internal surface area of the material relative to the substrate alone.

In preferred embodiments, the invention is in the form of a poultice (or sacrificial render) with the agent for increasing the internal surface area being diatomaceous earth, and the substrate being cellulose fibres and the invention will be herein described with reference to that particular embodiment, although a skilled addressee would understand that other substrates and agents which increase the internal surface area of the poultice thereby increasing the capillary action of the poultice may also be used.

Preferably, the agent for increasing the internal surface area of the poultice is in a finely particulate form.

Commonly available diatomaceous earth may be used. Diatomaceous earth having particle sizes at the smaller end of the usual range (for example, around 3 $\mu$m) provides greater drawing power, however diatomaceous earth of a larger size (for example, up to 1 mm) is also satisfactory in poultices according to the present invention.

Perlite (a rhyolite glass) is another preferred agent which may be used in place of or in addition to, diatomaceous earth. The agent used must also be inert to the masonry used.

Preferably, the fibrous material contains relatively long fibres, such as would be obtained from the manufacturing or pulping of quality paper, for example fibres in the range 1 mm to 4 mm with a weighted average of 2–3 mm. Without wishing to be bound by theory, it is believed that the individual fibres of the porous fibrous material are coated by diatomaceous earth particles. The two interact dramatically increasing the capillary suction over either alone. The fibre thereby forms a very effective wick to transfer salt laden fluids away from the masonry, the process being driven by evaporation. Not only do the microscopic and submicroscopic properties of the mixture contribute to the overall function of the present invention, but the mechanical properties are desirable from the point of view of application and quick and clean removal from the masonry surface.

It has been found that a ratio of fibrous material to diatomaceous earth in the range 1:6 to 6:1 has given good results in for most applications. Where the poultice is to be applied to a curved surface, higher ratios of diatomaceous earth may be used to reduce delamination on drying. Where the poultice is to be applied to a flat surface, higher ratios of fibrous material may be used to assist removal from the surface when the poulticing is complete. Poultices with high ratios of fibrous material to diatomaceous earth (up to 6:1) can be subjected to a stronger pull when being removed from the wall and more conveniently come away in larger portions. For most applications, fibrous material to diatomaceous earth in ratios of between 1:2 arid 2:1 are preferred, with 1:1 being more preferred.

In highly preferred embodiments, the poultice or sacrificial render contains a binding or thickening agent, such as a cellulose thickener, for example carboxymethyl cellulose.

The poultice or sacrificial render may also contain a biocide. Suitable biocides are those which are commercially available for use with pulps.

Desirably, the poultice or sacrificial render is, when dry, 4–5 mm in thickness.

In a second aspect, the invention also provides a mixture including a material according to the second aspect and water.

This mixture may also include a binder or thickening agent, such as a cellulose thickener, and a biocide. A pH adjusting substance, such as calcium carbonate, may also be added to adjust the pH to desirable levels, usually around pH 7.5.

In a third aspect, the invention provides a method of removing salt from a salt-permeable object including the steps of applying to the salt-permeable object a poultice, said poultice including a mixture of a fluid permeable substrate and an agent for increasing the internal surface area of the material relative to the substrate alone, and retain said poultice on said surface for a time sufficient for salt to permeate from the salt permeable object into the poultice.

If desired, a fresh poultice may be reapplied after removal of the original poultice Preferably, the mixture is applied by means of spray, most preferably from a plastering pump, such as a positive displacement pump at a rate of around 3–5 kg per square meter.

It is preferable that the poultice mixture is applied wet to give a source coating no more than 20 mm wet thickness and more preferably 8–10 mm wet thickness.

Again, without wishing to be bound by theory, the applicant believes that wet application, as well as providing the necessary adhesion to masonry surfaces activates the salts in the masonry wall and commences the poulticing procedure—in effect, the capillaries in the poulticing mixture are already primed by the presence of water. Thus, when evaporation commences at the surface, the salt laden water within the stone is already in fluid connection with the evaporating water at the surface of the poultice. The water in the mixture thus serves multiple purposes—it provides the material in a slurry form for application to an object, it acts as an adhesive to keep the poultice in place when wet, and it primes the capillaries and dissolves salts in the outer regions of the object, allowing the wicking process to begin.

BEST MODE FOR CARRYING OUT THE INVENTION

Figure 1:
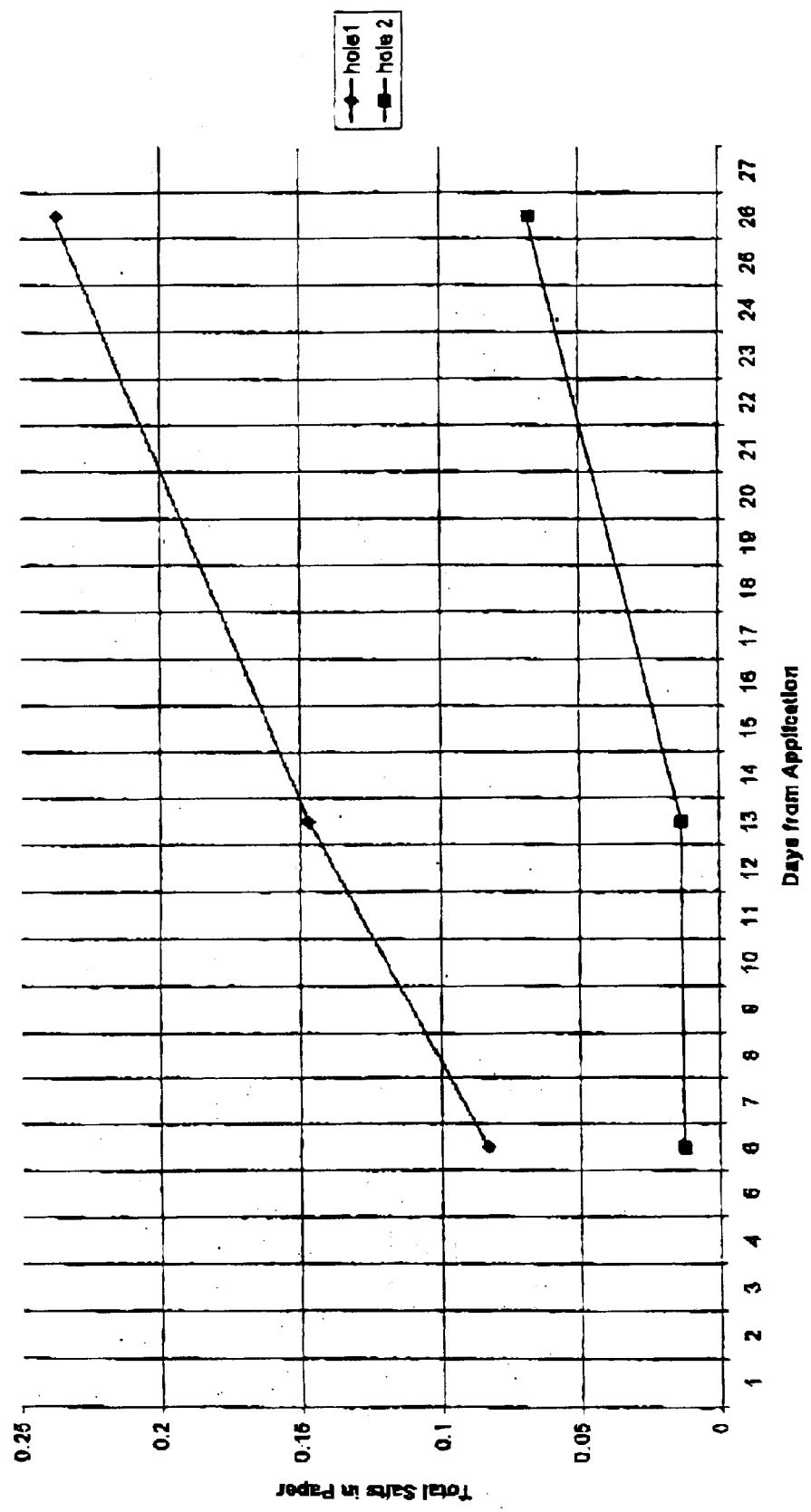
FIG. 1 shows the salt uptake of a sacrificial render according to the present invention against time for two different locations in a salt affected wall.

A preferred embodiment of the invention will now be described by way of example only.

EXAMPLE 1

Poultice Mixture

Virgin or repulped paper and diatomaceous earth are mixed in a 1:1 w/w ratio. Water is added until the total solids content is around 12.5%. For example, 125 kg of a 1:1 mixture of fibrous material is mixed with a quantity of water sufficient to give around 1000 liters of mixture. An effective amount of carboxymethyl cellulose thickener, 0.3 kg is added to thicken the mixture to an acceptable level for spraying through a positive displacement pump, to prevent the diatomaceous earth and pulp from setting prior to application, and to create a slight aeration of the mixture which results in a more effective sacrificial render. An effective amount (around 0.03 kg) of a biocide may also be added depending on when and where the mixture is to be used. Suitable biocides are those commercially available for use with paper pulps.

Calcium Carbonate may also be added to adjust the pH to around 7.5. Usually, around 3 Kg/1000 Kg batch of mixture is required.

In the present example, repulped filter papers were used, as these have long fibres and are generally free of contaminants. Recycled pulp may be used, although the use of such pulp is not recommended where contaminants such as ink are present, as these affect the masonry.

EXAMPLE 2

Application

The poultice mixture from Example 1 can be applied with a plastering trowel or sprayed onto masonry through a positive displacement pump or a gravity feed hopper gun. It is applied on the surface to achieve a surface coating of about 8–10 mm. The poultice may be smoothed or textured as desired.

For curved surfaces, more diatomaceous earth is used, up to 6:1 relative to the amount of fibrous material, to prevent delamination as the poultice dries.

EXAMPLE 3

Drying

The poultice mixture applied in example 2 is allowed to dry. Under normal conditions, the poultice gives a dry sacrificial render in about 3–4 days. The sacrificial render adheres to the wall but shrinks to a thickness of 4–5 mm. If desired, the render may be removed by peeling off in large pieces. If the surface is flat, more fibrous material may be used, up to 6:1 relative to the amount of diatomaceous earth. This poultice can withstand a stronger pull and is more readily removed in larger pieces.

EXAMPLE 4

Salt Removal

The sacrificial render of example 3 becomes effective at removing salt from a wall as it dries. Efflorescence of salt crystals may be brushed or scraped periodically from the surface of the render and removed if desired, although this is not necessary. In normal use, after 3–4 weeks, up to around 85% of the salt will be removed from the wall, depending upon the exact situation, which may include such variables as the nature of the stone, the extent of salt contamination and the prevailing climatic conditions. The sacrificial render may be removed after this time, or left in place for ongoing protection of the wall.

EXAMPLE 5

Controlled Studies—Building I

Controlled studies were carried out on an internal salt contaminated harbourside wall which was more than 150 years old, where there was stone decay from both rising and falling damp.

Two test holes were drilled in a badly salt contaminated wall, one 490 mm above the floor and one 1480 mm above the floor. Samples were taken at a depth of 0–10 mm, 10–20 mm and 20–40 mm in each hole to determine the salt content of the sandstone. The coating was then applied to a thickness of 10 mm. The salt content of some unapplied poultice was also determined. After 2 weeks, the salt concentration of the sandstone and the poultice were remeasured.

The results are shown in Table 1.

TABLE 1

| | Initial condition of Sandstone Wall - Building I | | | | | | |
|---|---|---|---|---|---|---|---|
| Location | Ca % | K % | Mg % | Na % | Cl % | $NO_3$ % | $SO_4$ % |
| Hole 1 | | | | | | | |
| 0–10 mm | 0.150 | 0.030 | 0.015 | 0.965 | 1.060 | 0.090 | 0.920 |
| 10–20 mm | 0.040 | 0.030 | 0.005 | 0.515 | 0.485 | 0.060 | 0.450 |
| 20–40 mm | 0.010 | 0.025 | <0.005 | 0.415 | 0.445 | 0.040 | 0.230 |

TABLE 1-continued

Initial condition of Sandstone Wall - Building I

| Location | Ca % | K % | Mg % | Na % | Cl % | NO$_3$ % | SO$_4$ % |
|---|---|---|---|---|---|---|---|
| Hole 2 | | | | | | | |
| 0–10 mm | 0.200 | 0.035 | <0.005 | 0.600 | 0.345 | 0.085 | 1.020 |
| 10–20 mm | 0.045 | 0.020 | <0.005 | 0.120 | 0.090 | 0.020 | 0.055 |
| 20–40 mm | 0.025 | 0.025 | <0.005 | 0.250 | 0.020 | 0.015 | 0.195 |

The salt levels at 0–10 mm in the Number 2 Holes are high, mainly due to rising damp, but a component due to falling damp is also possible. Because of the marine environment, sodium chloride is the major contaminant. As expected, the total salt content is highest around 1.5 m above the floor, because this is where the rising water tends to dry out. It can be seen that there is significant salt contamination further back from the surface.

An analysis of the salts present in the unapplied poultice and those extracted from the applied poultice are shown in table 2.

TABLE 2

Poultrice Salts - Building I

| Sample | Ca % | K % | Mg % | Na % | Cl % | NO$_3$ % | SO$_4$ % |
|---|---|---|---|---|---|---|---|
| Unapplied Poultice | 0.140 | <0.005 | 0.010 | 0.025 | 0.085 | 0.015 | 0.040 |
| Applied Poultice Week 1 | | | | | | | |
| Hole 1 (N) | 0.225 | 0.020 | 0.015 | 2.735 | 4.890 | 0.010 | 0.355 |
| Hole 2 (N) | 0.025 | 0.015 | <0.005 | 0.415 | 0.270 | 0.055 | 0.375 |
| Applied Poultice Week 2 | | | | | | | |
| Hole 1 (S) | 0.070 | 0.080 | 0.010 | 5.325 | 6.985 | 0.375 | 1.830 |
| Hole 2 (S) | 0.020 | 0.020 | <0.005 | 0.480 | 0.380 | 0.085 | 0.290 |

Initially, the poultice bad a total soluble salt content of 0.32%. This was mainly due to the presence of added calcium carbonate, which was added to the mix to produce an alkaline condition. The other contaminants are probably due to the presence of materials from the tap water used.

It can be seen that an appreciable amount of salts were transferred into the poultice after just two weeks. The total transfer at No 1 holes were particularly high, and rose from 8.3% after 6 days to 14.7% after 13 days.

Extended Trail

The performance of the coating in absorbing salt is shown in the table below.

TABLE 3

Total Salt in Poultice - Building I

| Total Salts | 6 Days | 13 days | 26 Days |
|---|---|---|---|
| Location 1 | 8.3% | 14.7% | 23.7% |
| Location 2 | 1.2% | 1.3% | 6.8% |

TABLE 4

Salt in Stone - Building I

| Total Salts | Initial % | 26 Days % |
|---|---|---|
| Hole No 1 | | |
| 0–10 mm | 3.2 | 1.6 |
| 10–20 mm | 1.6 | 0.7 |
| 20–40 mm | 1.2 | 0.6 |
| Hole No 2 | | |
| 0–10 mm | 2.3 | 0.3 |
| 10–20 mm | 0.4 | 0.2 |
| 20–40 mm | 0.5 | 0.17 |

It can be seen that in some places, a reduction of 87% of the salts has occurred, with reductions of 50% or greater being common. Graphing the data also shows that the rate of salt uptake by the poultice has not slowed greatly over this period. See FIG. 1

Inspection of the Render After Extended Use

After 26 days, the poultice showed no signs of cracking or other damage. The deposition of salt crystals on the surface was also noticeable.

EXAMPLE 6

Building II

Further tests were carried out on an exposed stone wall located several hundred meters from the ocean. The total salt concentration of the stone at two different locations and varying depths was monitored subsequent to the application of the poultice in February. At both locations it can be seen that the application of the poultice reduced the total soluble salt content of the stone at all depths in a relatively short period.

TABLE 5

Salt in Stone - Building II
Total Soluble Salt Content (% by wt.)

| | Hole No. 1 (L.H.S. of Building) | | | Hole No. 2 (R.H.S. of Building) | | |
|---|---|---|---|---|---|---|
| Hole Depth | Feb | Mar | April | Feb | Mar | April |
| 0–10 mm | 0.94 | 0.88 | 0.27 | 0.66 | 0.25 | 0.11 |
| 10–20 | 0.11 | — | 0.04 | 0.07 | — | 0.04 |
| 20–40 | 0.05 | — | 0.03 | 0.08 | — | 0.04 |

TABLE 6

Poultice Salts - Building II

| Sample | Ca % | K % | Mg % | Na % | Cl % | NO$_3$ % | SO$_4$ % |
|---|---|---|---|---|---|---|---|
| LHS | | | | | | | |
| 0–10 | 0.025 | 0.020 | 0.030 | 0.020 | 0.020 | <0.005 | 0.150 |
| 10–20 | <0.005 | 0.020 | <0.005 | <0.005 | <0.005 | <0.005 | <0.005 |
| 20–40 | <0.005 | 0.015 | <0.005 | <0.005 | <0.005 | <0.005 | <0.005 |
| RHS | | | | | | | |
| 0–10 | 0.025 | 0.020 | 0.030 | 0.010 | <0.005 | <0.005 | 0.015 |
| 10–20 | <0.005 | 0.020 | <0.005 | <0.005 | <0.005 | <0.005 | <0.005 |
| 20–40 | <0.005 | 0.020 | <0.005 | <0.005 | <0.005 | <0.005 | <0.005 |

EXAMPLE 7

Building III

The results of the salt determinations obtained from drillings taken in the cornices of a stone building located in a polluted environment a few kilometers from the sea are shown in table 7.

A series of holes were drilled and samples of salt concentration were taken at depths of 0–10, 10–20, 20–40, 80–100, and 150–170 mm. In addition, samples were taken from the loose debris on the weathered surface.

TABLE 7

Initial Total Soluble Salt Content
[% by weight] - Building III

|  | S22 | S35 |
|---|---|---|
| Weathered Surface | 0.89 | — |
| 0–10 mm | 1.28 | 0.93 |
| 10–20 mm | 0.58 | 0.59 |
| 20–40 mm | 0.21 | 0.53 |
| 80–100 mm | 0.09 | 0.24 |
| 150–170 mm | 0.10 | 0.21 |

As is typical of salt contamination in cornice soffits, most of the salts are concentrated close to the surface and diminish with increasing depth.

The poultice was applied as above for a period of 4.5 weeks. The poultices were removed and the salt content analysed. The results in table 8 show a significant amount of salt has been transferred to the two poultices at S22 and S35.

TABLE 8

Salt in Poultices, Building III

| Location | Total Salts [% by wt.] |
|---|---|
| S22 | |
| No. 1, Back | 1.77 |
| No. 1, Front | 1.35 |
| No. 2, Front | 0.88 |
| S35 | |
| No. 1, Back | 0.53 |
| No. 1, Front | 1.25 |
| No. 2, Front | 1.17 |

The salt transfer shown in table 8 is consistent with the salts in the original stone drillings. The rain salts transferred were sulphates, mostly magnesium and then calciums. Some chlorides and nitrates present in smaller quantities in the stone were also transferred into the poultice.

The results of the analysis of the extractable salts present in the poultice samples are shown in table 9.

TABLE 9

Poultice Salts, Building III

| Sample | Ca % | K % | Mg % | Na % | Cl % | NO$_3$ % | SO$_4$ % |
|---|---|---|---|---|---|---|---|
| S22 | | | | | | | |
| North Back 1 | 0.130 | 0.005 | 0.305 | 0.030 | 0.175 | 0.125 | 1.000 |
| North Front 1 | 0.095 | <0.005 | 0.245 | 0.020 | 0.090 | 0.055 | 0.845 |
| 11/1 2 | 0.130 | 0.005 | 0.110 | 0.020 | 0.090 | 0.050 | 0.470 |
| S35 | | | | | | | |
| South Back | 0.110 | <0.005 | 0050 | 0.035 | 0.165 | 0.050 | 0.120 |
| South Front 1 | 0.115 | 0.005 | 0.205 | 0.030 | 0.180 | 0.055 | 0.660 |
| 11/1 2 | 0.105 | <0.005 | 0.195 | 0.020 | 0.125 | 0.035 | 0.685 |

The total salt contents for the 2 sets of drilling are shown in table 10.

TABLE 10

Salt in Stone - Building III

|  | S22 | | S35 | |
|---|---|---|---|---|
|  | Dec | Jan | Dec | Jan |
| 0–10 mm | 1.28 | 1.21 | 0.93 | 0.69 |
| 10–20 mm | 0.58 | 0.27 | 0.59 | 0.55 |
| 20–40 mm | 0.21 | 0.11 | 0.53 | 0.47 |

Comparisons between the two sets of results taken before the application of the poultice and after 4.5 weeks of poulticing show that reductions occurred with all 6 samples. The most appreciable reductions occurred at S22 at 10–20mm and 20–40mm and at 10–10 mm for S35.

The analysis of poultice salts for building III is shown in Table 11. Previously the major contaminant was magnesium sulphate. The current results for S22 show that most of the magnesium has been removed. It was also reduced at 0–10 mm in S35 but to a lesser extent. However at 0–10 mm for S22, calcium sulphate has now become the major sulphate and the sulphate levels deeper in the stone are now small. This suggests that the poultice is functioning below the surface and is drawing salts down from deeper in the stone.

TABLE 11

Poultice Salts, Building III

| Sample | Ca % | K % | Mg % | Na % | Cl % | NO$_3$ % | SO$_4$ % |
|---|---|---|---|---|---|---|---|
| S22 | | | | | | | |
| 0–10 | 0.265 | 0.025 | 0.060 | 0.015 | 0.025 | 0.045 | 0.775 |
| 10–20 | 0.025 | 0.045 | 0.025 | 0.015 | 0.015 | 0.020 | 0.120 |
| 20–40 | <0.005 | 0.025 | 0.010 | 0.015 | 0.010 | 0.015 | 0.035 |
| S35 | | | | | | | |
| 0–10 | 0.020 | 0.030 | 0.130 | 0.010 | 0.030 | 0.015 | 0.450 |
| 10–20 | 0.025 | 0.035 | 0.095 | 0.015 | 0.040 | 0.015 | 0.320 |
| 20–40 | 0.025 | 0.035 | 0.075 | 0.020 | 0.035 | 0.015 | 0.260 |

EXAMPLE 8

Building IV

Building IV was an old stone building in a marine environment. As expected sodium chloride was the main contaminant but there was also a significant amount of sulphates present and a little nitrite.

'Before' and 'after' salt determinations of the poulticed stone were not carried out however the poultice was applied in a manner similar to that described above for a number of weeks. The total soluble salt content of the poultice after removal was 6.89%, which was quite high. It was not determined whether there was still appreciable salt contamination left in the stone.

The results of the analysis of the extractable salts present in the sample are shown in Table 12.

TABLE 12

Poultice Salts, Building IV

| | Ca % | K % | Mg % | Na % | Cl % | NO$_3$ % | SO$_4$ % |
|---|---|---|---|---|---|---|---|
| Sample | 0.055 | 0.225 | 0.080 | 2.185 | 2.215 | 0.250 | 1.875 |

Although the invention has been described with reference to a specific example, it will be appreciated by those skilled in the art that the invention may be embodied in many other forms.

The claims of the invention are as follows:

1. A method of removing salt from a salt permeable object including the steps of:
   applying to the salt-permeable object a poultice or sacrificial render, said poultice or sacrificial render including
      a fluid permeable substrate comprising cellulose fibres, and
      an agent for increasing the internal surface area of the poultice or sacrificial render relative to the substrate alone, said agent comprising an agent selected from diatomaceous earth or perlite; and
   retaining said poultice or sacrificial render on said surface for a time sufficient for salt to permeate from the salt permeable object into the poultice or sacrificial render.

2. A method according to claim 1 wherein the fluid permeable substrate and agent are mixed with water to form a slurry prior to application to the salt permeable object.

3. A method according to claim 1 wherein the poultice or sacrificial renders is applied to the permeable object by means of spray.

4. A method according to claim 1 wherein the poultice or sacrificial render is applied by means of a plastering pump.

5. A method according to claim 1 wherein the poultice or sacrificial render is applied by means of a positive displacement pump.

6. A method according to claim 1 wherein the poultice or sacrificial render is applied at a rate of 3–5 kg per square meter.

7. A method according to claim wherein the poultice or sacrificial render is applied at no more than 20 mm wet thickness.

8. A method according to claim 1 wherein the poultice or sacrificial render is applied between 8 to 10 mm wet thickness.

9. A method according to claim 1 wherein the poultice or sacrificial render is allowed to dry after application.

10. A method according to claim 1 wherein the poultice or sacrificial render is removed from the salt permeable object after at least one of the time sufficient for salt to permeate the poultice or sacrificial render and a quantity of salt has been transferred from the salt permeable object to the poultice or sacrificial render.

11. A method according to claim 10 wherein a fresh poultice or sacrificial render is reapplied after removal of the poultice or sacrificial render.

12. A method according to claim 1 wherein the length of the fibres is between 1 and 4 mm.

13. A method according to claim 12 wherein the length of the fibres has an average of 2.5 mm.

14. A method according to claim 1 wherein the fibrous substrate is obtained from the manufacturing and/or pulping of paper.

15. A method according to claim 1 wherein the ratio of substrate to agent is in the range of 1:6 to 6:1.

16. A method according to claim 15 wherein the ratio of substrate to agent is in the range of 1:2 to 2:1.

17. A method according to claim 16 wherein the ratio of substrate to agent is 1:1.

18. A method according to claim 12 wherein the poultice or sacrificial render further includes a binding or thickening agent.

19. A method according to claim 18 wherein the binding or thickening agent is a cellulose thickener.

20. A method according to claim 19 wherein the cellulose thickener is carboxymethylcellulose.

21. A method according to claim 12 further including a biocide.

22. A method according to claim 12 wherein the poultice is 4–5 mm in thickness when dry.

* * * * *

UNITED STATES PATENT AND TRADEMARK OFFICE
CERTIFICATE OF CORRECTION

PATENT NO. : 6,544,329 B1
DATED : April 8, 2003
INVENTOR(S) : Barrie David Cooper It is certified that error appears in the above-identified patent and that said Letters Patent is hereby corrected as shown below:

Column 2,
Line 47, change "arid" to -- and --.

Column 3,
Line 4, change "retain" to -- retaining --.
Line 8, after "poultice" insert -- . --.
Line 28, change "Poultrice" to -- Poultice --.

Column 5,
Line 44, change "bad" to -- had --.
Line 55, change "Trail" to -- Trial --.

Column 6,
Line 20, after "FIG. 1" insert -- . --.
Line 48, insert -- The results of the analysis of the extractable salts from Building II present in the example are shown in Table 6. --

Column 9,
Line 21, change "renders" to -- render --.

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,544,329 B1
DATED         : April 8, 2003
INVENTOR(S)   : Barrie David Cooper It is certified that error appears in the above-identified patent and that said Letters Patent is hereby corrected as shown below:

Column 2,
Line 47, change "arid" to -- and --.

Column 3,
Line 4, change "retain" to -- retaining --.
Line 8, after "poultice" insert -- . --.

Column 5,
Line 28, change "Poultrice" to -- Poultice --.
Line 44, change "bad" to -- had --.
Line 55, change "Trail" to -- Trial --.

Column 6,
Line 20, after "FIG. 1" insert -- . --.
Line 48, insert -- The results of the analysis of the extractable salts from Building II present in the example are shown in Table 6. --

Column 9,
Line 21, change "renders" to -- render --.

This certificate supersedes Certificate of Correction issued September 9, 2003.

Signed and Sealed this

Twenty-eighth Day of October, 2003

JAMES E. ROGAN
*Director of the United States Patent and Trademark Office*